(12) United States Patent
Sawada et al.

(10) Patent No.: US 9,899,891 B2
(45) Date of Patent: Feb. 20, 2018

(54) POWER FEED SECTION STRUCTURE OF ELECTRIC POWER ASSISTING MOTOR APPARATUS

(71) Applicant: Mitsubishi Electric Corporation, Tokyo (JP)

(72) Inventors: Kazuki Sawada, Tokyo (JP); Kazuhisa Takashima, Tokyo (JP); Hideya Nishikawa, Tokyo (JP); Yusuke Funabiki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 297 days.

(21) Appl. No.: 14/784,206

(22) PCT Filed: Nov. 19, 2013

(86) PCT No.: PCT/JP2013/081151
§ 371 (c)(1),
(2) Date: Oct. 13, 2015

(87) PCT Pub. No.: WO2014/196096
PCT Pub. Date: Dec. 11, 2014

(65) Prior Publication Data
US 2016/0079825 A1    Mar. 17, 2016

(30) Foreign Application Priority Data

Jun. 6, 2013 (JP) ................................. 2013-119553

(51) Int. Cl.
*H02K 11/00*    (2016.01)
*H02K 5/22*    (2006.01)
(Continued)

(52) U.S. Cl.
CPC ............. *H02K 5/225* (2013.01); *H02K 3/522* (2013.01); *H02K 5/08* (2013.01); *H02K 11/0073* (2013.01);
(Continued)

(58) Field of Classification Search
CPC .... H02K 5/225; H02K 11/0073; H02K 11/30; H02K 11/33; H02K 2203/03; H02K 2203/06; H02K 2203/09; H02K 2213/03
See application file for complete search history.

(56) References Cited

U.S. PATENT DOCUMENTS

2006/0091746 A1    5/2006    Takeuchi
2010/0060100 A1    3/2010    Urano et al.

FOREIGN PATENT DOCUMENTS

CN    202634100 U    12/2012
JP    61218339 A    9/1986
(Continued)

OTHER PUBLICATIONS

Communication dated Jan. 20, 2017 from the European Patent Office in counterpart European application No. 13886561.3.
(Continued)

*Primary Examiner* — Ramon M Barrera
(74) *Attorney, Agent, or Firm* — Sughrue Mion, PLLC; Richard C. Turner

(57) ABSTRACT

The connection terminal and the power supply terminal are held by a common holding member made of a resin. The power supply terminal includes a press-fitting portion press-fitted into a press-fitted portion of the holding member. The press-fitted portion of the holding member has a shape that is long in a plate width direction of the power supply terminal and short in a plate thickness direction of the power supply terminal. Assuming that a dimension of each of both end portions of the press-fitted portion in the plate width direction of the power supply terminal is defined as L1, a dimension of a center portion of the press-fitted portion is
(Continued)

defined as L2, and a plate thickness of the power supply terminal is defined as T, L2<T<L1 is satisfied under a non-press-fitted state.

8 Claims, 7 Drawing Sheets

(51) Int. Cl.
*H02K 11/33* (2016.01)
*H02K 11/30* (2016.01)
*H02K 3/52* (2006.01)
*H02K 5/08* (2006.01)

(52) U.S. Cl.
CPC ............ *H02K 11/30* (2016.01); *H02K 11/33* (2016.01); *H02K 2203/06* (2013.01); *H02K 2203/09* (2013.01); *H02K 2213/03* (2013.01)

(56) References Cited

FOREIGN PATENT DOCUMENTS

| | | |
|---|---|---|
| JP | 2008-079469 A | 4/2008 |
| JP | 2009-005538 A | 1/2009 |
| JP | 2009-247061 A | 10/2009 |
| JP | 2011-182511 A | 9/2011 |
| JP | 2013-102596 A | 5/2013 |
| WO | 2013038572 A1 | 3/2013 |

OTHER PUBLICATIONS

International Search Report for PCT/JP2013/081151 dated Feb. 4, 2014.

//<br>

POWER FEED SECTION STRUCTURE OF ELECTRIC POWER ASSISTING MOTOR APPARATUS

CROSS REFERENCE TO RELATED APPLICATIONS

This application is a National Stage of International Application No. PCT/JP2013/081151 filed Nov. 19, 2013, claiming priority based on Japanese Patent Application No. 2013-119553 filed Jun 6, 2013, the contents of all of which are incorporated herein by reference in their entirety.

TECHNICAL FIELD

The present invention relates to a power supply unit structure of an electric power assist motor apparatus, which is configured to assist an operation force.

BACKGROUND ART

Hitherto, a power supply unit structure of an electric motor apparatus for an electric power steering of an automobile or the like includes a bus bar unit including coil connection terminals and a bracket holder unit including external connection terminals.

Bus bars made of copper are each insert-molded into a main body of the bus bar unit, which is made of a synthetic resin. The bus bars include power supply terminals as the coil connection terminals, and bus bar terminals. Terminals made of copper are each insert-molded into a main body of the bracket holder unit, which is made of a synthetic resin. The terminals include external power supply terminals as the external connection terminals, and connection terminals. The bus bar unit and the bracket holder unit are connected through welding between the bus bar terminals and the connection terminals. The power supply terminals of the bus bar unit are each connected to a coil, and the external power supply terminals of the bracket holder unit are each connected to an ECU (see, for example, Patent Literature 1).

Further, in the power supply unit structure, the bus bar unit and the bracket holder unit, which are each obtained by insert-molding the members made of copper, are connected through the welding.

CITATION LIST

Patent Literature

[PTL 1] JP 2008-79469 A

SUMMARY OF INVENTION

Technical Problem

However, in the above-mentioned related-art power supply unit structure of an electric motor apparatus for an electric power steering, in order to maintain insulation property and enhance dimensional accuracy, the bus bar unit including the coil connection terminals and the bracket holder unit including the external connection terminals each have the structure in which the members made of copper are insert-molded into the main body made of a synthetic resin. Therefore, there is a disadvantage in that the number of components and cost are increased.

The present invention has been made in view of the above, and has an object to provide a power supply unit structure of an electric power assist motor apparatus, which is capable of suppressing increase in the number of components and cost.

Solution to Problem

In order to achieve the object described above, according to one embodiment of the present invention, there is provided a power supply unit structure of an electric power assist motor apparatus, including: a connection terminal to be connected to a coil of an electric motor for outputting an assist torque; and a power supply terminal to be connected to a control circuit unit for controlling drive of the electric motor, in which the connection terminal and the power supply terminal are held by a common holding member made of a resin, in which the power supply terminal includes a press-fitting portion press-fitted into a press-fitted portion of the holding member, in which the press-fitted portion of the holding member has a shape that is long in a plate width direction of the power supply terminal and short in a plate thickness direction of the power supply terminal, and in which, assuming that a dimension of each of both end portions of the press-fitted portion in the plate width direction of the power supply terminal is defined as L1, a dimension of a center portion of the press-fitted portion in the plate width direction of the power supply terminal is defined as L2, and a plate thickness of the power supply terminal is defined as T, the dimension L1, the dimension L2, and the plate thickness T satisfy L2<T<L1 under a non-press-fitted state.

Advantageous Effects of Invention

According to the one embodiment of the present invention, it is possible to provide the power supply unit structure of an electric power assist motor apparatus, which is capable of suppressing increase in the number of components and cost.

DESCRIPTION OF EMBODIMENTS

Figure 1:
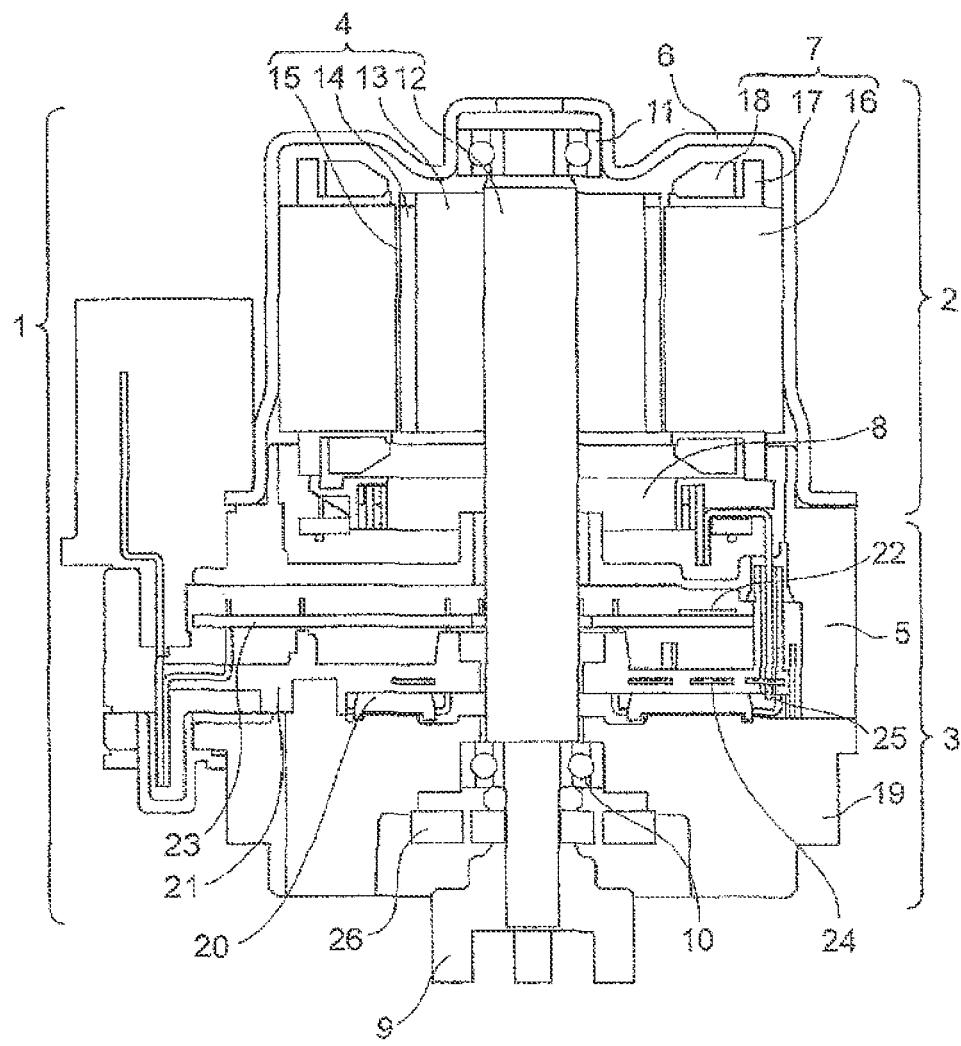
FIG. 1 is a schematic view for illustrating an internal structure of an electric motor apparatus for an electric power steering according to a first embodiment of the present invention.

Now, referring to the accompanying drawings, description is made of embodiments in a case where a power supply unit structure of an electric power assist motor apparatus of the present invention is applied as a power supply unit structure of an electric motor apparatus for an electric power steering of a moving object such as an automobile. Note that, in the drawings, the same reference symbols represent the same or corresponding parts.

First Embodiment

FIG. 1 is a schematic view for illustrating an internal structure of an electric motor apparatus for an electric power steering according to a first embodiment of the present invention. An electric motor apparatus 1 for an electric power steering includes an electric motor 2 for outputting an assist torque to a steering wheel of the automobile, and a control circuit unit 3 for controlling drive of an output shaft of the electric motor 2. The electric motor apparatus 1 for an electric power steering has a delta connection structure including ten poles and twelve slots.

The electric motor 2 includes a rotator 4, a frame 6 fitted into a housing 5, a stator 7 fixed to an inner wall surface of the frame 6, a terminal unit 8 fixed to one end surface of the stator 7, and a boss 9 press-fitted onto an end portion of the rotator 4 and coupled to a speed-reduction mechanism (not shown).

The rotator 4 includes a shaft 12 supported by a front bearing 10 and a rear bearing 11 in a freely rotatable manner, a core 13 fixed to the shaft 12, a magnet 14 fixed to a surface of the core 13, and a protective cover 15 covering a surface of the magnet 14.

The stator 7 includes a stator core 16 having slots (not shown) each extending in an axial direction and being formed at intervals in a circumferential direction, and a stator coil 18 formed by winding a copper wire in each of the slots of the stator core 16 through intermediation of a bobbin 17.

The control circuit unit 3 includes a drive unit 21 having power elements 20 and the like mounted on one end side of a heat sink 19, for supplying electric power to the electric motor 2, a control circuit 23 having a microcomputer 22 and the like mounted thereon, for controlling the supply of electric power, and terminal portions 24 for supplying electric power to the drive unit 21. Drive-unit motor terminals 25 are joined to the power elements 20 of the drive unit 21. The power elements 20 of the drive unit 21 are each electrically joined to the terminal unit 8 (power supply terminal 28 described later) through the drive-unit motor terminal 25. A resolver 26, which is a rotation position sensor for detecting a rotation angle of the rotator 4, is fixed on the heat sink 19 side (power element 20 side) of the drive unit 21, that is, an opposite side to the electric motor 2.

Figure 2:
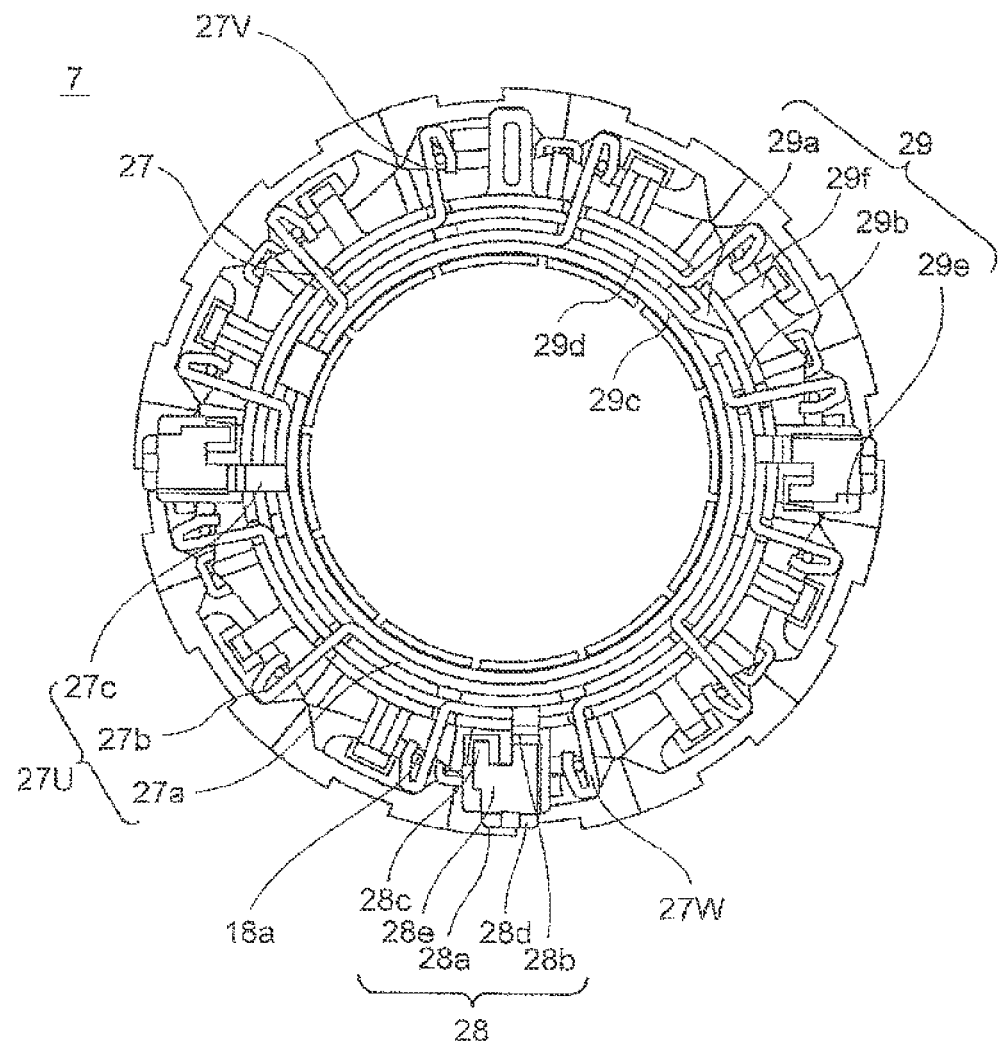
FIG. 2 is a front view of a stator of the electric motor apparatus for an electric power steering when viewed from a terminal unit side.

FIG. 2 is a front view of the stator of the electric motor apparatus for an electric power steering when viewed from the terminal unit side. The terminal unit 8 includes connection terminals 27 made of a metal such as copper, the power supply terminals 28 made of a metal such as copper, and a holding member 29 made of a resin, for holding the connection terminals 27 and the power supply terminals 28. The power supply terminals 28 and the connection terminals 27 are held by the common holding member 29 made of a resin.

The connection terminals 27 include three types of terminals, specifically, a U-phase terminal 27U, a V-phase terminal 27V, and a W-phase terminal 27W. Each of the connection terminals 27U, 27V, and 27W is sectioned into a main body 27a, an arm portion 27b, and a relay joining portion 27c (note that, the U-phase terminal 27U is taken as a representative case to illustrate the main body, the arm portion, and the relay joining portion in FIG. 2). The power supply terminal 28 is formed of a plate-like member, and is sectioned into a main body 28a, a relay joining portion 28b, a plate-like press-fitting portion 28c, and an electrical joining portion 28d to be joined to the control circuit unit 3. The holding member 29 is sectioned into a groove portion 29a, an outer wall 29b, an inner wall 29c, an insulating wall 29d, a power supply terminal base 29e, and a fitting portion 29f to be fitted into the bobbin 17.

The semi-circular main body 27a of the connection terminal 27 is inserted into and held on the groove portion 29a of the holding member 29. The arm portion 27b of the connection terminal 27 is electrically joined to a coil end portion of the stator coil 18 through fusing welding or the like. Each of the connection terminals 27U, 27V, and 27W is insulated by the insulating wall 29d of the holding member 29.

On the other hand, in the power supply terminal 28, the press-fitting portion 28c is press-fitted into the holding member 29 up to a point where a seating surface 28e of the main body 28a is seated on the power supply terminal base 29e of the holding member 29. The relay joining portion 27c of the connection terminal 27 and the relay joining portion 28b of the power supply terminal 28 are electrically joined to each other through welding or the like, thereby achieving the delta connection.

Figure 3:
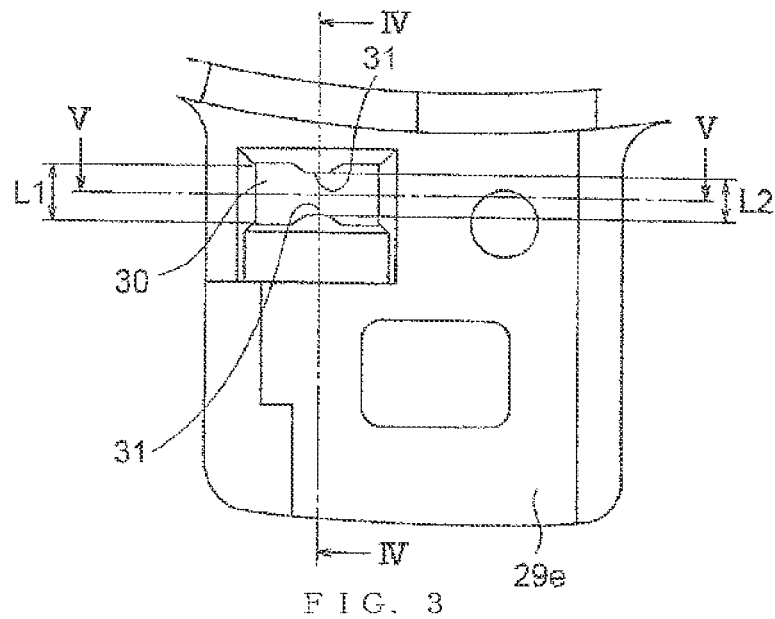
FIG. 3 is a plan view of a press-fitted portion of a holding member according to the first embodiment of the present invention.
Figure 4:
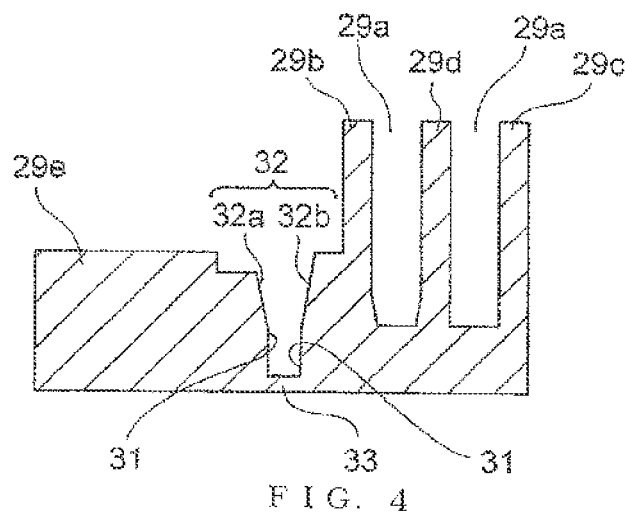
FIG. 4 is a sectional view of the press-fitted portion of the holding member taken along the line IV-IV of FIG. 3.
Figure 5:
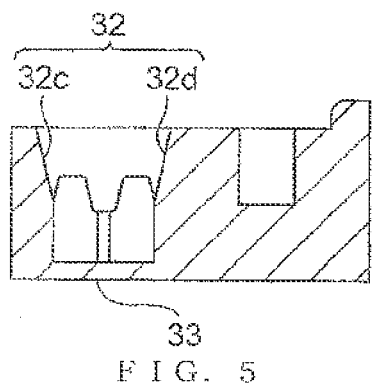
FIG. 5 is a sectional view of the press-fitted portion of the holding member taken along the line V-V of FIG. 3.
Figure 6:
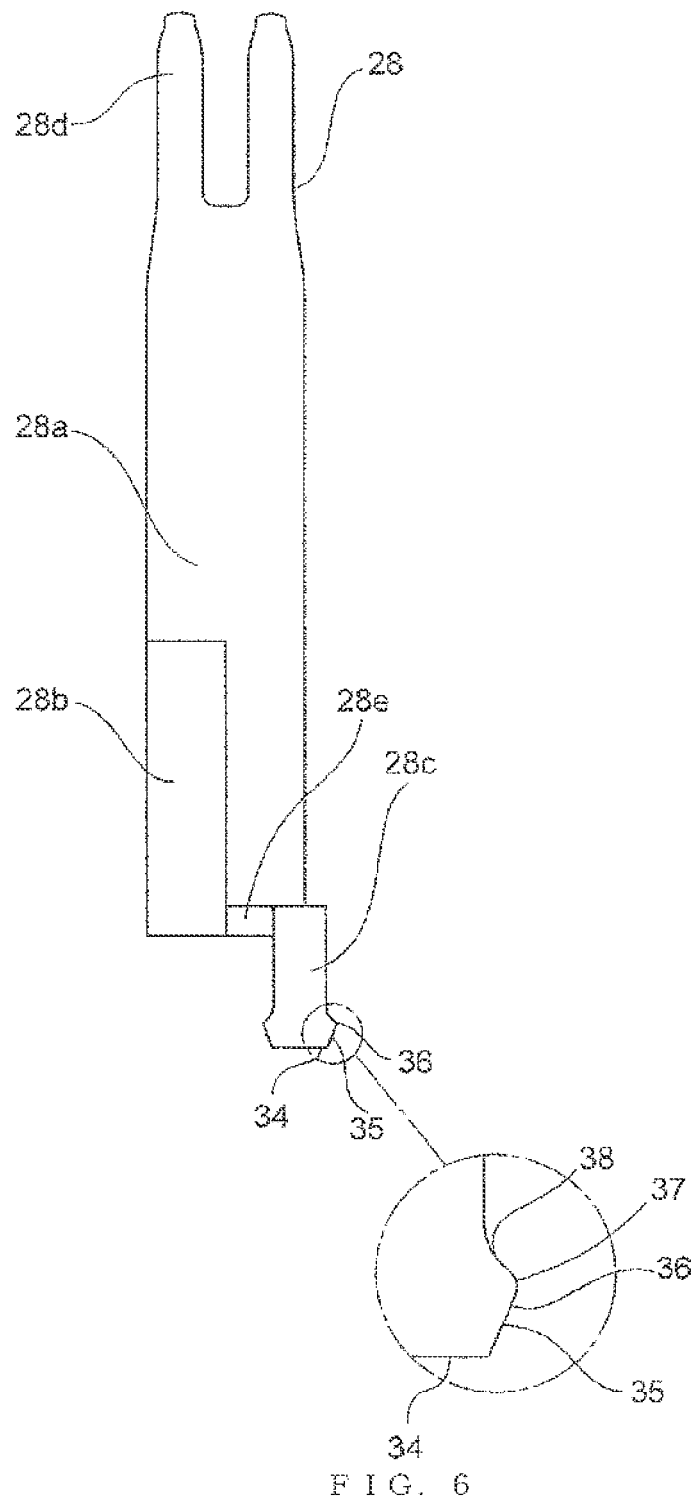
FIG. 6 is a front view of a power supply terminal according to the first embodiment of the present invention.
Figure 7:
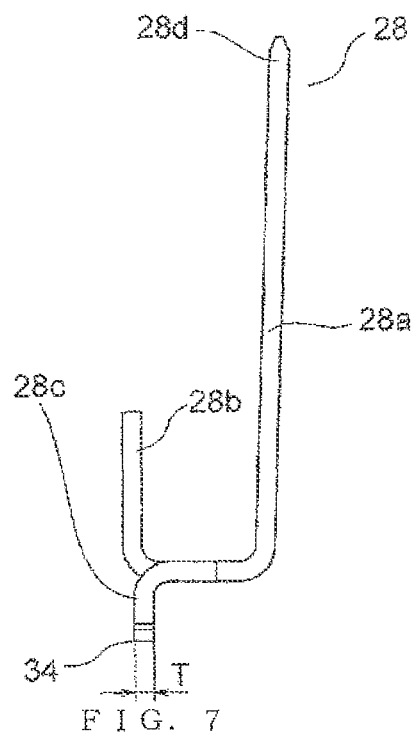
FIG. 7 is a side view of the power supply terminal according to the first embodiment of the present invention.
Figure 8:
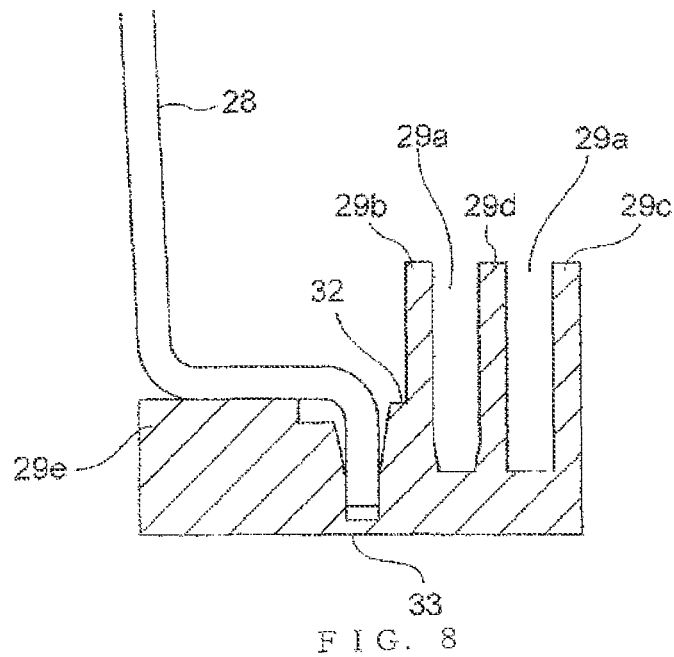
FIG. 8 is a sectional view for illustrating a state in which a press-fitting portion of the power supply terminal is press-fitted into the press-fitted portion of the holding member according to the first embodiment of the present invention.

FIG. 3 is an illustration of a state of a press-fitted portion 30 of the holding member 29 in plan view, into which the press-fitting portion 28c of the power supply terminal 28 is press-fitted. Further, FIG. 4 and FIG. 5 are illustrations of cross-sections of the press-fitted portion 30 in directions different from each other. Further, FIG. 6 and FIG. 7 are respectively a front view and a side view of the power supply terminal. In addition, FIG. 8 is a sectional view for illustrating a state in which the press-fitting portion of the power supply terminal is press-fitted into the press-fitted portion of the holding member.

As understood from FIG. 3 to FIG. 5, the press-fitted portion 30 of the holding member 29 is a hole having a substantially rectangular shape in plan view, which is long in a plate width direction of the power supply terminal 28 (right-and-left direction in the drawing sheet of FIG. 3) and short in a plate thickness direction of the power supply terminal 28 (up-and-down direction in the drawing sheet of FIG. 3). In other words, a dimension of the press-fitted portion 30 in the plate width direction of the power supply terminal 28 is larger than a dimension of the press-fitted portion 30 in the plate thickness direction of the power supply terminal 28. Further, under a non-press-fitted state, the dimension of the press-fitted portion 30 in the plate thickness direction of the power supply terminal 28 is not constant over the plate width direction of the power supply terminal 28. That is, as illustrated in FIG. 3, a dimension L2 of a center portion 31 of the above-mentioned substantially rectangular shape in plan view in the plate width direction of the power supply terminal 28 is smaller than a dimension L1 of each of both end portions of the above-mentioned substantially rectangular shape in plan view in the plate width direction of the power supply terminal 28. Further, assuming that a plate thickness of the power supply terminal 28 is defined as T, the relationship of L2<T<L1 is satisfied under the non-press-fitted state.

With the above-mentioned relationship, the press-fitting portion 28c of the power supply terminal 28 is press-fitted only into the center portion 31 of the press-fitted portion 30 (that is, the center portion in the plate width direction of the power supply terminal 28, which corresponds to a longitudinal direction of the press-fitted portion 30) rather than being inserted into the entire press-fitted portion 30 of the holding member 29.

Further, in a part of the holding member 29 in which the press-fitted portion 30 is formed, one surface side corresponds to an opening side (opening portion) 32 as a press-fitting side, whereas the other surface side corresponds to a closing side 33. The opening side 32 has four tapered portions 32a, 32b, 32c, and 32d each formed to be widened from a hole-depth side toward the opening.

As illustrated in FIG. 6, the press-fitting portion 28c of the power supply terminal 28 has a flat distal end 34, a tapered portion 35, and a connecting portion 38 connected to the tapered portion 35. The tapered portion 35 is widened toward the connecting portion 38, and a circular arc portion 37 is formed on a coupling portion between a terminal end 36 of the widened portion of the tapered portion 35 and the connecting portion 38.

In the power supply unit structure of an electric motor apparatus for an electric power steering, which is structured as described above, the power supply terminal 28 and the connection terminal 27 are held by the same holding member 29 made of a resin. Thus, the number of components and cost can be reduced. Further, a part of the power supply terminal 28 is press-fitted into the holding member 29. In this structure, dimensional accuracy of the resin member has a limit. Therefore, when unevenness is caused in interference of the press-fitting portion, the press-fitting of the power supply terminal is not appropriate, and hence it is considered that positional accuracy is degraded and easiness of assembling is also degraded. In view of the circumstance, the following attempts are made in the first embodiment. That is, in the first embodiment, the press-fitted portion 30 of the holding member 29 has the substantially rectangular shape that is long in the plate width direction of the power supply terminal 28 and short in the plate thickness direction. Further, the dimension L2 of the center portion 31 of the press-fitted portion 30 is smaller than the dimension L1 of each of both the end portions. Therefore, the press-fitting portion 28c of the power supply terminal 28 is press-fitted only into the center portion 31 of the press-fitted portion 30 of the holding member 29. With this structure, even when unevenness is caused in dimension of the press-fitting portion of the holding member 29, unevenness of a press-fitting force is suppressed, and the power supply terminal 28 is normally press-fitted into, seated on, held on, and positioned on the holding member 29 as desired. Thus, the positional accuracy of the power supply terminal 28 is enhanced, and the easiness of assembling is also enhanced.

Further, in the part of the holding member 29 in which the press-fitted portion 30 is formed, one surface side corresponds to the opening side 32, whereas the other surface side corresponds to the closing side 33. That is, the press-fitted portion 30 is a bottomed hole portion (concave portion), and hence even when the holding member 29 made of a resin may be chipped due to the press-fitting, chips accumulate in the concave portion, namely, the press-fitted portion 30 of the holding member 29. Thus, it is possible to prevent a problem in that the chips drop into the motor to be sandwiched between the rotator and the stator so that loss torque may be increased.

Further, the tapered portions 32a, 32b, 32c, and 32d each widened from the hole-depth side toward the opening are formed on a press-fitting inlet side (opening side 32) of the press-fitted portion 30 of the holding member 29. Therefore, positional correction is achieved even when slight positional deviation is caused between the power supply terminal 28 and the holding member 29 at the time of press-fitting the power supply terminal 28. Thus, the power supply terminal 28 is normally press-fitted into the holding member 29.

Further, the tapered portion 35 narrowed toward the distal end 34 is formed on the press-fitting portion 28c of the power supply terminal 28. Therefore, the positional correction is achieved even when the slight positional deviation is caused between the power supply terminal 28 and the holding member 29 at the time of press-fitting the power supply terminal 28. Thus, the power supply terminal 28 is normally press-fitted into the holding member 29.

In addition, in the press-fitting portion 28c of the power supply terminal 28, the circular arc portion 37 is formed on a part connecting (part coupling) the terminal end 36 of the widened portion of the tapered portion 35 and the connecting portion 38. Therefore, even when the slight positional deviation is caused between the power supply terminal 28 and the holding member 29 at the time of press-fitting the power supply terminal 28, the contact area between the press-fitting portion 28c and an inner wall of the press-fitted portion 30 of the holding member 29 is small. Thus, increase in the press-fitting force is suppressed.

Second Embodiment

Figure 9:
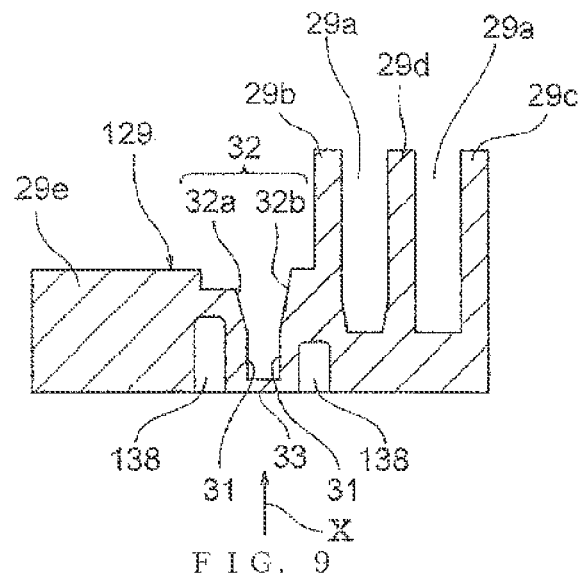
FIG. 9 is a sectional view of a press-fitted portion of a holding member according to a second embodiment of the present invention.
Figure 10:
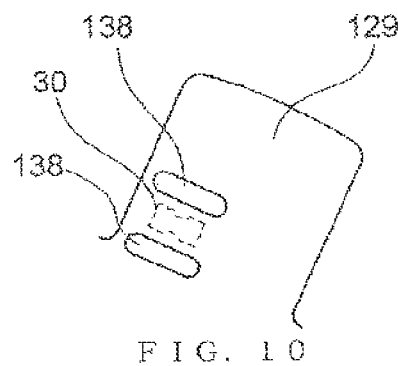
FIG. 10 is a back view of the press-fitted portion of the holding member when viewed in a direction of the arrow X of FIG. 9.

Next, a second embodiment of the present invention is described. Note that, the second embodiment is similar to the above-mentioned first embodiment except for parts described below. FIG. 9 is a sectional view of a press-fitted portion of a holding member according to the second embodiment, and FIG. 10 is a back view of the press-fitted portion of the holding member when viewed in a direction of the arrow X of FIG. 9.

In the second embodiment, a press-fitted portion 30 similar to that of the above-mentioned first embodiment is formed in a holding member 129, and a pair of back surface grooves 138 is formed on an opposite side to a press-fitting inlet of the press-fitted portion 30 (press-fitting side opening portion 32 having the substantially rectangular shape). The back surface grooves 138 are arranged respectively on both sides of the press-fitted portion 30 in the plate thickness direction of the power supply terminal 28. As understood from a relationship in position and shape in FIG. 10 between the pair of back surface grooves 138 and the press-fitted portion 30 indicated by the dotted line in a projected manner, the back surface grooves 138 are each formed to be arranged at a distance from an outer shape on a longitudinal side of the press-fitted portion 30 having the substantially rectangular shape when viewed in a press-fitting direction in a projected manner (in plan view). In other words, the pair of back surface grooves 138 is formed apart from the press-fitted portion 30 in the plate thickness direction of the power supply terminal 28 when viewed in the press-fitting direction in a projected manner (in plan view).

In the power supply unit structure of an electric motor apparatus for an electric power steering according to the second embodiment, which is structured as described above, in addition to the advantages obtained in the above-mentioned first embodiment, the following advantages can be obtained. The press-fitting portion 28c of the power supply terminal 28 is press-fitted into the center portion 31 in the plate width direction corresponding to the longitudinal direction of the press-fitted portion 30. However, at this time, due to the above-mentioned relationship of L2<T<L1, the press-fitted portion 30 of the holding member 29 is to expand outward. On the other hand, the pair of back surface grooves 138 are each formed at a given distance on an outside of the longitudinal side of the substantially rectangular shape on the opposite side to the press-fitting side opening portion 32 having the substantially rectangular shape in the holding member 29. Thus, the thickness from the press-fitted portion 30 of the holding member 29 to each of the back surface grooves 138 is small. Therefore, the press-fitting portion 28c can be press-fitted with a force smaller than in the case where the back surface grooves 138 are not formed. As a result, the unevenness of the press-fitting force is further suppressed. Note that, the above-mentioned back surface grooves 138 are described in a mode in which the back surface grooves 138 are each formed as the bottomed concave portion. Instead of this, a mode in which the back surface grooves 138 are each formed as a through hole without a bottom may be employed.

Third Embodiment

Figure 11:
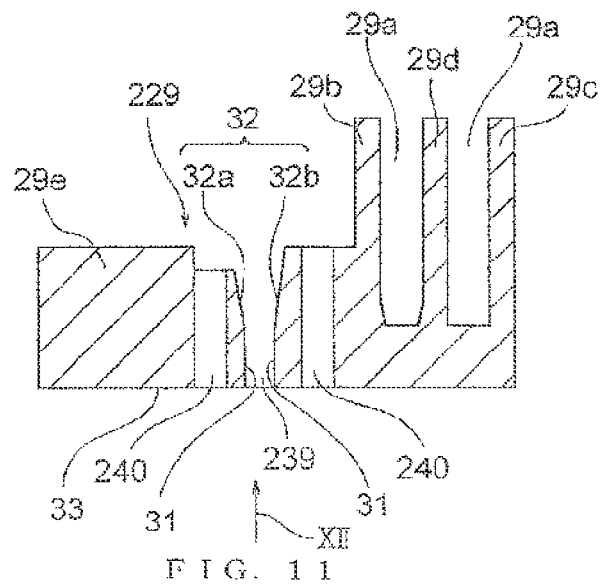
FIG. 11 is a sectional view of a press-fitted portion of a holding member according to a third embodiment of the present invention.
Figure 12:
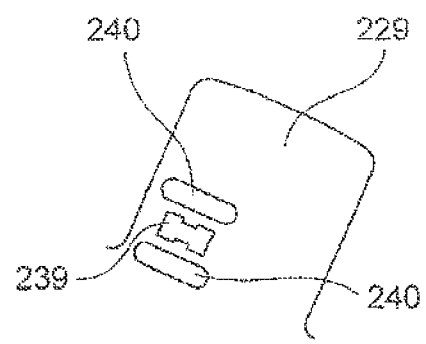
FIG. 12 is a back view of the press-fitted portion of the holding member when viewed in a direction of the arrow XII of FIG. 11.

Next, a third embodiment of the present invention is described. Note that, the third embodiment is similar to the above-mentioned first or second embodiment except for parts described below. FIG. 11 is a sectional view of a press-fitted portion of a holding member according to the third embodiment, and FIG. 12 is a back view of the press-fitted portion of the holding member when viewed in a direction of the arrow XII of FIG. 11.

In the second embodiment, a press-fitted portion 239 being a through hole is formed in a holding member 229 instead of the press-fitted portion 30 according to the above-mentioned first embodiment. The press-fitted portion 239 being the through hole corresponds to a mode in which the bottom is eliminated in the press-fitted portion 30 according to the first embodiment to form a hole up through a back-surface side 233 (the other surface side, the opposite side to the press-fitting side opening portion 32).

Further, in the second embodiment, a pair of back surface holes 240 is formed in the holding member 229 on the opposite side to a press-fitting inlet (press-fitting side opening portion 32 having a substantially rectangular shape) of the press-fitted portion 239. The back surface holes 240 are arranged respectively on both sides of the press-fitted portion 239 in the plate thickness direction of the power supply terminal 28. As understood from a relationship in position and shape in FIG. 12 between the pair of back surface holes 240 and the press-fitted portion 239 indicated by the dotted line in a projected manner, the back surface holes 240 are each formed to be arranged at a distance from an outer shape on a longitudinal side of the press-fitted portion 239 having the substantially rectangular shape when viewed in the press-fitting direction in a projected manner (in plan view). In other words, the pair of back surface holes 240 is formed apart from the press-fitted portion 239 in the plate thickness direction of the power supply terminal 28 when viewed in the press-fitting direction in a projected manner (in plan view).

In the power supply unit structure of an electric motor apparatus for an electric power steering according to the third embodiment, which is structured as described above, in addition to the advantages obtained in the above-mentioned first embodiment, the following advantages can be obtained. In the third embodiment, the press-fitted portion 239 of the holding member 229 is formed as the through hole. In addition, the back surface holes 240 are each formed at a given distance on an outside of the press-fitting side opening portion 32 having the substantially rectangular shape in the holding member 229, and the back surface holes 240 are each formed as the through hole. Therefore, the press-fitting portion 28c can be press-fitted with a force smaller than in the case of the bottomed press-fitted portion with the closed back-surface side. As a result, the unevenness of the press-fitting force can further be suppressed, and the chipping of the holding member made of a resin, which is caused due to the press-fitting, can also be suppressed significantly. Further, the back surface holes 240 are each formed as the through hole, and hence there is an advantage in that it is possible to obtain an effect of reducing the press-fitting force and suppressing the chipping of the holding member from the initial stage of the press-fitting.

Although the details of the present invention are specifically described above with reference to the preferred embodiments, it is apparent that persons skilled in the art may adopt various modifications based on the basic technical concepts and teachings of the present invention.

First, in the above-mentioned embodiments, description is mainly made of the case where the present invention is applied to the apparatus for assisting a steering operation of the steering wheel of the automobile. However, the present invention is not limited thereto, and may also be applied to an apparatus for assisting an operation of a moving object other than the automobile, or an apparatus for assisting an operation in a facility or equipment.

Further, the present invention is described as the power supply unit structure, but may be carried out as an electric motor apparatus for an electric power steering having the power supply unit structure, and further, may be carried out as an electric power assist motor apparatus having the power supply unit structure.

Further, the electric motor according to the present invention is exemplified to have the delta connection including ten poles and twelve slots. However, the present invention is not limited thereto. That is, the number of the poles and the number of the slots in the electric motor may be arbitrarily combined, and the connection may be delta connection or Y connection.

REFERENCE SIGNS LIST 1 electric motor apparatus for electric power steering, 2 electric motor, 3 control circuit unit, 27 connection terminal, 28 power supply terminal, 28c press-fitting portion, 29, 129, 229 holding member, 30, 239 press-fitted portion, 32 opening side, 32a to 32d tapered portion, 34 distal end, 35 tapered portion, 36 terminal end, 37 circular arc portion, 138 back surface groove, 240 back surface hole

The invention claimed is:
1. A power supply unit structure of an electric power assist motor apparatus, comprising:
   a connection terminal to be connected to a coil of an electric motor for outputting an assist torque; and
   a power supply terminal to be connected to a control circuit unit for controlling drive of the electric motor,
   wherein the connection terminal and the power supply terminal are held by a common holding member made of a resin, wherein the power supply terminal comprises a press-fitting portion press-fitted into a press-fitted portion of the holding member, wherein the press-fitted portion of the holding member has a shape that is long in a plate width direction of the power supply terminal and short in a plate thickness direction of the power supply terminal, and wherein, assuming that a dimension of each of both end portions of the press-fitted portion in the plate width direction of the power supply terminal is defined as L1, a dimension of a center portion of the press-fitted portion in the plate width direction of the power supply terminal is defined as L2, and a plate thickness of the power supply terminal is defined as T, the dimension L1, the dimension L2, and the plate thickness T satisfy L2<T<L1 under a non-press-fitted state.

2. A power supply unit structure of an electric power assist motor apparatus according to claim 1, wherein a part of the holding member in which the press-fitted portion is formed has one surface side being an opening side and another surface side being a closing side, and wherein the press-fitted portion comprises a bottomed hole portion.

3. A power supply unit structure of an electric power assist motor apparatus according to claim 1, wherein the press-fitted portion of the holding member comprises a through hole.

4. A power supply unit structure of an electric power assist motor apparatus according to claim 2, wherein the press-fitted portion of the holding member comprises a tapered portion formed on a press-fitting inlet side thereof, which is widened from a hole-depth side toward an opening.

5. A power supply unit structure of an electric power assist motor apparatus according to claim 1, wherein a pair of back surface grooves is formed in the holding member on an opposite side to the press-fitting inlet side of the press-fitted portion, wherein the back surface grooves are arranged respectively on both sides of the press-fitted portion in the plate thickness direction of the power supply terminal, and wherein the pair of back surface grooves is formed apart from the press-fitted portion in the plate thickness direction of the power supply terminal when viewed in a press-fitting direction in a projected manner.

6. A power supply unit structure of an electric power assist motor apparatus according to claim 1, wherein back surface holes are formed on both sides of the press-fitted portion in the plate thickness direction of the power supply terminal, respectively, and wherein the pair of back surface holes is formed apart from the press-fitted portion in the plate thickness direction of the power supply terminal when viewed in a press-fitting direction in a projected manner.

7. A power supply unit structure of an electric power assist motor apparatus according to claim 1, wherein the press-fitting portion of the power supply terminal comprises a tapered portion narrowed toward a distal end thereof.

8. A power supply unit structure of an electric power assist motor apparatus according to claim 7, wherein the press-fitting portion of the power supply terminal comprises a circular arc portion on a part connecting a terminal end of a widened portion of the tapered portion and a portion connected to the tapered portion.

* * * * *